United States Patent [19]

Danel

[11] 4,177,226
[45] Dec. 4, 1979

[54] DEVICE FOR INJECTION OF A GAS IN A LIQUID

[75] Inventor: François Danel, St Martin d'Uriage, France

[73] Assignee: Alsthom-Atlantique, France

[21] Appl. No.: 932,642

[22] Filed: Aug. 10, 1978

Related U.S. Application Data

[63] Continuation of Ser. No. 797,036, May 16, 1977, abandoned.

[30] Foreign Application Priority Data

May 25, 1976 [FR] France .................................. 76 15785

[51] Int. Cl.² ................................................ C02C 5/04
[52] U.S. Cl. ..................................... 261/124; 261/77; 210/221 P
[58] Field of Search ................. 267/76, 77, 30, 121 R, 267/124, DIG. 75; 210/220, 221 R, 221 P

[56] References Cited

U.S. PATENT DOCUMENTS

| 828,940 | 8/1906 | Lanard | 261/77 |
|---|---|---|---|
| 1,982,258 | 11/1934 | Martin | 261/77 |
| 2,135,043 | 11/1938 | Seman | 261/77 |
| 2,730,496 | 1/1956 | Zavod | 261/124 |
| 3,015,190 | 1/1962 | Arbeit | 261/77 |
| 3,774,846 | 11/1973 | Schurig et al. | 261/76 |
| 3,817,500 | 6/1974 | Cooper | 261/77 |

Primary Examiner—Frank W. Lutter
Assistant Examiner—Gregory N. Clements
Attorney, Agent, or Firm—John J. Hart

[57] ABSTRACT

A device for bubbling gas into a liquid; means are provided at the point of exit of the bubbles from the device to provide a liquid flow that sweeps the bubbles into the liquid, thereby provoking early detachment of the bubbles from the device.

1 Claim, 1 Drawing Figure

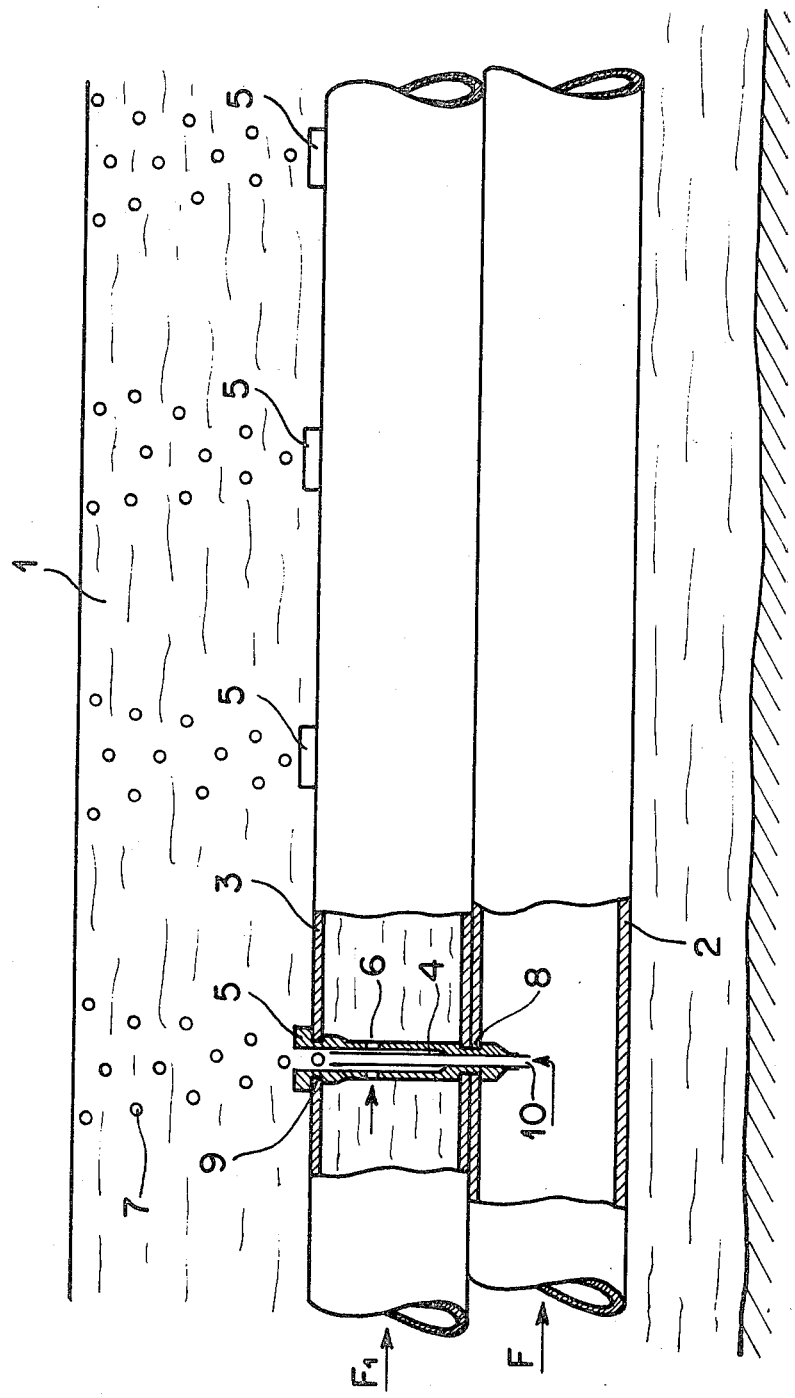

DEVICE FOR INJECTION OF A GAS IN A LIQUID

This is a continuation of application Ser. No. 797,036 filed May 16, 1977, now abandoned.

This invention relates to an improved means for injecting gas into a liquid. In applicant's U.S. patent application Ser. No. 655,901 filed Feb. 6, 1975 there is disclosed a device which provides a high degree of uniformity in the injection of bubbles of required diameter. The device of said application and the improved means disclosed herein are both applicable to numerous industrial methods, in particular in the field of fermentation, chemical reactions, oxygenation of sheets of water with a view to combatting pollution and biological control of oxygen requirements. With said device or the means disclosed herein, it is also possible to modify a medium physically and in particular to modify its acoustic properties.

The device of said prior application is constituted by a gas supply unit with at least part of its walls immersed in the liquid at the place where said gas is to be injected. Tubes having a small inside diameter (less than 2 mm) and whose length is at least 20 times that of their inside diameter are connected along the immersed walls. The gas escapes in the form of bubbles from the free ends of the tubes into the liquid, these ends being such that they can be moved over small distances under the influence of the injection of the gas into the liquid and of the currents caused by such injection.

When bubbles are formed, at the time when they are emitted from the end of the tube, the bubbles grow until they reach a diameter which is generally slightly greater than that of the outside diameter of the tube.

Further, the above-mentioned U.S. patent application relates to variants of such a device in which a liquid current is produced at the emission point of the bubbles, which has the effect of sweeping the bubbles along and causing them to become detached before they reach the size which they would have in substantially still water.

Smaller bubbles can thus be obtained which are advantageous for some particular applications.

This liquid current also causes the resilient tube to vibrate, this again encouraging the detachment of the gas bubble.

The present invention provides a particularly advantageous embodiment of a gas injection device according to which each drop emission unit is constituted by a resilient tube surrounded by a concentric chamber open at its top end, the resilient tube being fed with gas through its bottom end and emitting bubbles of gas through its top end, the chamber being supplied with liquid through peripheral orifices this liquid being ejected at its top end close to the emission point of the bubbles in the form of a current exerting a thrusting effect on the bubbles which causes them to be detached.

Such an embodiment is described hereinbelow by way of example with reference to the accompanying drawing.

This FIGURE shows a sheet of liquid 1 which it is required to put into intimate contact with a gas.

A pipe 2 supplying gas in the direction shown by an arrow F and a pipe 3 supplying liquid in the direction shown by an arrow F1 are disposed at the bottom of the sheet of water.

Each gas injection device is constituted by a resilient tube 4 surrounded by an annular chamber 5 which is open at its top part.

The gas arriving under pressure through the pipe 2 enters the resilient tube 4 through its bottom end 10 and is injected into the sheet of liquid through the top end of this tube. The liquid arriving under pressure through the pipe 3 enters the annular chamber 5 through peripheral orifices 6 and produces an annular current along the tube 4 generating a thrust at its end on the gas bubbles at its emission point thereby detaching them when small, so that very small bubbles are obtained.

These gas injection devices are very compact and can easily be inserted at various points along the two pipes 2 and 3 for supplying liquid and gas as shown in the accompanying drawing, by means of two annular constrictions 8 and 9 embedded in a sealed manner in orifices prepared for that purpose in said pipes.

What I claim is:

1. Apparatus for injecting separate small bubbles of gas into a body of liquid to be treated by such gas, comprising a plurality of spaced elongated tubes of small inside diameter, each of said tubes having an outer end portion in communication with the liquid to be treated and provided with a bubble emission opening adjacent to such liquid body, and each of said tubes having an inner end portion provided with a gas admission opening, a tubular member enclosing the outer end portion of each of said tubes and forming therewith a concentric annular chamber having a closed inner end and an open outer end located close to the emission opening of the enclosed tube, port means in each tubular member located intermediate the outer and inner ends of the chamber formed thereby and spaced inwardly from the bubble emission opening of the tube enclosed by said tubular member, means supplying gas under pressure through the admission openings of said tubes to cause the formation of successive, separate bubbles at the bubble emission openings of said tubes, and means supplying liquid under pressure into said annular chambers through the port means of each tubular member to provide an annular liquid current along the outer end portion of the tube enclosed thereby and capable of generating an annular thrust on the gas bubbles forming at the emission opening of such tube, thereby causing such bubbles to be detached from such emission opening while small into said body of liquid, said means supplying gas under pressure to said tubes including a first conduit, and said means supplying liquid under pressure to said tubular members including a second conduit, the gas admission openings in said tubes being in communication with the interior of said first conduit, and said tubes and tubular members extending transversely of said second conduit through opposed inner and outer openings provided in said second conduit, the bubble emission openings of said tubes and the open outer ends of said annular chambers being both adjacent to said outer conduit openings, said first and second conduits being superimposed, the outer ends of said tubular members being secured to the edges of said outer openings provided in said second conduit, and the inner end of each of said tubular members being secured to the edge of its associated inner opening in said second conduit and the edge of an adjacent outer opening in said first conduit and coupling said conduits together.

* * * * *